(12) United States Patent
Alkasimi et al.

(10) Patent No.: US 9,519,941 B1
(45) Date of Patent: Dec. 13, 2016

(54) SYSTEM AND METHOD FOR EXCHANGING TRANSPORTATION DATA VIA WEARABLE DEVICES

(71) Applicant: American Airlines, Inc., Fort Worth, TX (US)

(72) Inventors: Hyder Alkasimi, Flower Mound, TX (US); Jonathan Campos, Frisco, TX (US)

(73) Assignee: AMERICAN AIRLINES, INC., Fort Worth, TX (US)

( * ) Notice: Subject to any disclaimer, the term of this patent is extended or adjusted under 35 U.S.C. 154(b) by 210 days.

(21) Appl. No.: 14/148,072

(22) Filed: Jan. 6, 2014

(51) Int. Cl.
*G06K 9/00* (2006.01)
*G06Q 50/30* (2012.01)
*H04N 7/18* (2006.01)

(52) U.S. Cl.
CPC .......... *G06Q 50/30* (2013.01); *G06K 9/00288* (2013.01); *H04N 7/18* (2013.01)

(58) Field of Classification Search
None
See application file for complete search history.

(56) References Cited

U.S. PATENT DOCUMENTS

| | | | | |
|---|---|---|---|---|
| 2011/0288768 | A1* | 11/2011 | Stefani | G06Q 30/0281 701/533 |
| 2013/0127980 | A1* | 5/2013 | Haddick | G06F 3/013 348/14.08 |
| 2013/0341389 | A1* | 12/2013 | Roderique | G06F 17/30879 235/375 |
| 2014/0369570 | A1* | 12/2014 | Cheikh | G07C 9/00031 382/116 |

* cited by examiner

*Primary Examiner* — Steven R Koziol
*Assistant Examiner* — Sean Conner
(74) *Attorney, Agent, or Firm* — Haynes and Boone, LLP

(57) ABSTRACT

A system and method for exchanging transportation data via wearable devices such as, for example, wearable computerized glasses, a wearable computerized wrist device, or a wearable computerized earpiece.

10 Claims, 13 Drawing Sheets

SYSTEM AND METHOD FOR EXCHANGING TRANSPORTATION DATA VIA WEARABLE DEVICES

BACKGROUND

The present disclosure relates in general to a system and method for exchanging transportation data via wearable devices such as, for example, wearable computerized glasses, a wearable computerized wrist device, or a wearable computerized earpiece.

DETAILED DESCRIPTION

Figure 1:
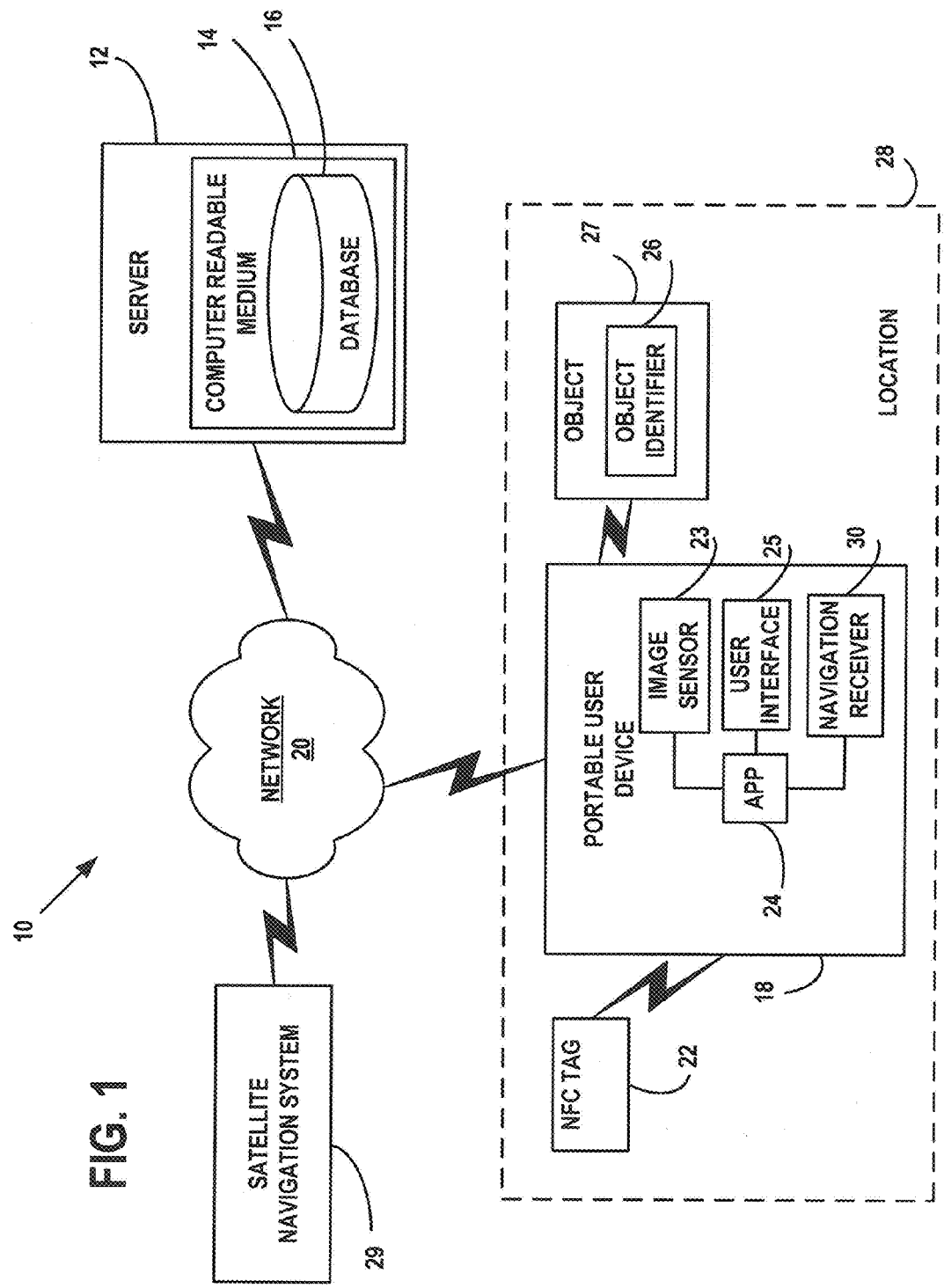
FIG. 1 is a diagrammatic illustration of a system according to an exemplary embodiment.

In an exemplary embodiment, as illustrated in FIG. 1, a system is generally referred to by the reference numeral 10 and includes a computer server 12, which includes a computer readable medium 14. Instructions accessible to, and executable by, the computer server 12 are stored on the computer readable medium 14. A database 16 is also stored on the computer readable medium 14. An electronic device such as, for example, a portable user device 18, is operably coupled to, and in communication with, the computer server 12 via a network 20. In several exemplary embodiments, the portable user device 18 is adapted to communicate with a near field communication (NFC) tag 22 via NFC, Bluetooth, infrared, proximity inference via, for example, Global Positioning System (GPS) or triangulation, or other indirect technologies. In several exemplary embodiments, the portable user device 18 is adapted to communicate with the NFC tag 22 via 802.11b, 802.11g, 802.11a, ultra wideband (UWB), multiple band rates, or other suitable technologies.

The portable user device 18 includes an image sensor 23, which may be a laser scanner, camera, sensor, or other suitable device. Additionally, a mobile application (or "app") 24 is stored on the portable user device 18. In several exemplary embodiments, the portable user device 18 includes a user interface 25. In several exemplary embodiments, the app 24 is in communication with and/or controls the image sensor 23 and the user interface 25. In several exemplary embodiments, the portable user device 18 is adapted to capture an object identifier 26 associated with an object 27 using the image sensor 23. The object 27 may be any one of a customer, a boarding pass, a maintenance part, a piece of baggage, and other transportation related object. In an exemplary embodiment, the object 27 is one of a customer of a good or service and an article used in connection with the good or service. In an exemplary embodiment, the good or the service is provided by a commercial airline. In several exemplary embodiments, one or more of the portable user device 18, the NFC tag 22, and the object 27 are located in a location 28 such as, for example, within an airplane operated by the commercial airline or within an airport. A satellite navigation system 29 is operably coupled to, and in communication with, the portable user device 18 via the network 20. In several exemplary embodiments, the satellite navigation system 29 is the Global Positioning System (GPS). In several exemplary embodiments, the portable user device 18 also includes a navigation receiver 30. In an exemplary embodiment, the navigation receiver 30 is a GPS receiver with Wide Area Augmentation System (WAAS) capability.

In an exemplary embodiment, the computer server 12 is a web application server, which in several exemplary embodiments includes and/or executes one or more web-based programs, Intranet-based programs, and/or any combination thereof. In several exemplary embodiments, the computer server 12 is a computing device that includes the computer readable medium 14 on which content, as well as computer programs or instructions, are stored, and one or more processors that execute the computer programs or instructions to, for example, provide the content to the portable user device 18, as will be described in further detail below. The content stored in the computer server 12 may include a wide variety of transportation data, including customer data such as, for example, personal information relating to the customer, flight information relating to the customer, and baggage information relating to the customer; data relating to loyalty programs; data relating to scheduling and airline operations; data relating to a facial recognition system such as, for example, facial image databases; data relating to an image recognition system, such as image databases; a QR decoding system; maintenance data such as, for example, data relating to maintenance and repairs of airplanes and airplane parts; data relating to speech recognition systems; employee data such as, for example, data relating to an employee's personal information, data relating to the employee's training information, and data relating to the employee's work schedule; and/or any other types of data.

In an exemplary embodiment, the portable user device 18 is a wearable device, or is otherwise worn or held by a user such as, for example, the employee of the commercial airline. The portable user device 18 is worn on the user's head, clothing, wrist, hand, fingers, ears, eyes, legs, or ankles. In an exemplary embodiment, the portable user device 18 is a wearable device such as, for example, glasses, goggles, a wristband, an earpiece, a watch, a glove, a ring, a hat, or an anklet. In an exemplary embodiment, the portable user device 18 may be one or more computing devices such as personal digital assistants, cellular devices, mobile telephones, wireless devices, handheld devices, audio devices, tablet computers, cameras, and/or any other suitable devices. In one embodiment, the portable user device 18 may be supplied by the customer or by the airline. In an exemplary embodiment, the portable user device 18 is a handheld or otherwise portable user device carried by the user such as, for example, a smartphone or tablet computer, such as, for example, an iPad® by Apple Inc. In another exemplary embodiment, the portable user device 18 is a smartphone such as, for example, an iPhone® by Apple Inc. The portable user device 18 includes a computer readable medium in which the application 24 is stored, and a processor that executes the application 24. In several exemplary embodiments, the user interface 25 includes a graphical display. In several exemplary embodiments, the portable user device 18 includes a speaker or electroacoustic transducer that produces sound in response to an electrical audio signal input. In an exemplary embodiment, the portable user device 18 is a thin client and the computer server 12 controls at least a portion of the operation of the portable user device 18. In an exemplary embodiment, the portable user device 18 is a thick client, and/or functions as both a thin client and a thick client. In several exemplary embodiments, the content stored in the computer server 12 may also be stored on the computer readable medium of the portable user device 18. In an exemplary embodiment, the portable user device 18 includes a microphone.

In an exemplary embodiment, the network 20 includes the Internet, one or more local area networks, one or more wide area networks, one or more cellular networks, one or more wireless networks, one or more voice networks, one or more data networks, Ethernet, one or more communication systems, and/or any combination thereof. In several exemplary embodiments, the network 20 includes one or more access points, each of which may be a router, wireless access point, or any other device or module, or a combination thereof, which enables communication between electronic devices, including between the computer server 12 and the portable user device 18. In an exemplary embodiment, the network 20 is a "cloud", which includes intermediary servers and data center servers connected through Wi-Fi, cellular, Bluetooth, Wi-Fi Direct, and other communication protocols.

In an exemplary embodiment, the NFC tag 22 may be removably connectable to an item within the location 28. In an exemplary embodiment, the NFC tag 22 is coupled to a visual seat identifier in the airplane. The visual seat identifier is located above a seat located on the airplane, to which the visual seat identifier is associated. The NFC tag 22 includes a seat identifier that identifies the seat associated with the visual seat identifier. In several exemplary embodiments, instead of the NFC tag 22, another type of smart or data tag may be connected to the visual seat identifier. In several exemplary embodiments, instead of being connected to the visual seat identifier, the NFC tag 22 may be connected to, for example, a portion of the seat associated with the visual seat identifier, to a tray associated with the seat associated with the visual seat identifier, to the back of the seat immediately in front of the seat associated with the visual seat identifier, or to a cabin wall or surface above or proximate to the seat associated with the visual seat identifier. In an exemplary embodiment, the NFC tag 22 is a data tag. In several exemplary embodiments, the NFC tag 22 and/or the satellite navigations system 29 may be omitted from the system 10, as shown in FIGS. 2, 4, 6, 7, 9, and 11. In an exemplary embodiment, the seat associated with the visual seat identifier is located on the airplane and is assigned to the customer for a short duration of time such as, for example, during a flight of the airplane. In an exemplary embodiment, the NFC tag 22 is connected to, or in the vicinity of, the seat assigned to the customer.

In an exemplary embodiment, the object 27 is an object to be identified. In an exemplary embodiment, the object 27 is the customer, which has a plurality of facial features, or is an article used in connection with the airline such as, for example, a piece of baggage that has a bar code or QR code attached, a boarding pass, etc.

In an exemplary embodiment, the object identifier 26 associated with the object 27 allows for the object 27 to be identified by the system 10. For example, when the object 27 is the customer, the object identifier 26 is the plurality of facial features, which the system 10 uses, along with the facial recognition system, to identify the customer. Additionally, when the object 27 is an airplane part, the object identifier 26 may be the plurality of dimensions, which the system 10 uses, along with the image recognition system, to identify the airplane part. When the object 27 is a boarding pass, the object identifier 26 may be a QR code that is attached to the boarding pass, which the system 10 uses, along with the QR decoding system, to find information associated with the QR code. In an exemplary embodiment, the object identifier 26 is a barcode such as, for example, a matrix barcode (QR code) or a linear bar code. In an exemplary embodiment, the object identifier 26 is assigned to the object 27 and stored on the portable user device 18 and/or the server 12 in response to a passenger enrolling in a club or program maintained by the commercial airline such as, for example a frequent flyer program.

In several exemplary embodiments, at least one of the application 24, the computer server 12, and the portable user device 18 includes a computer program including a plurality of instructions, data, and/or any combination thereof. In an exemplary embodiment, the application 24 is written in, for example, HyperText Markup Language (HTML), Cascading Style Sheets (CSS), JavaScript, Extensible Markup Language (XML), asynchronous JavaScript and XML (Ajax), and/or any combination thereof. In an exemplary embodiment, the application 24 is a web-based application written in, for example, Java or Adobe Flex, which pulls real-time information from the server 12. In an exemplary embodiment, the application 24 pulls real-time information from the server 12 upon the execution, opening or start-up of the application 24. In an exemplary embodiment, the application 24 is a web-based application written in, for example, Java or Adobe Flex, which pulls real-time information from the server 12, automatically refreshing with latest information every, for example, 45 seconds.

In several exemplary embodiments, one or more of the components of the system 10 and/or content stored therein, and/or any combination thereof, are part of, and/or are distributed throughout, the system 10 and/or one or more other components thereof. In several exemplary embodiments, the platforms of the system 10 are identical, different, or vary with respect to equipment, peripherals, hardware architecture and/or specifications, software architecture and/or specifications, and/or any combination thereof.

Figure 2:
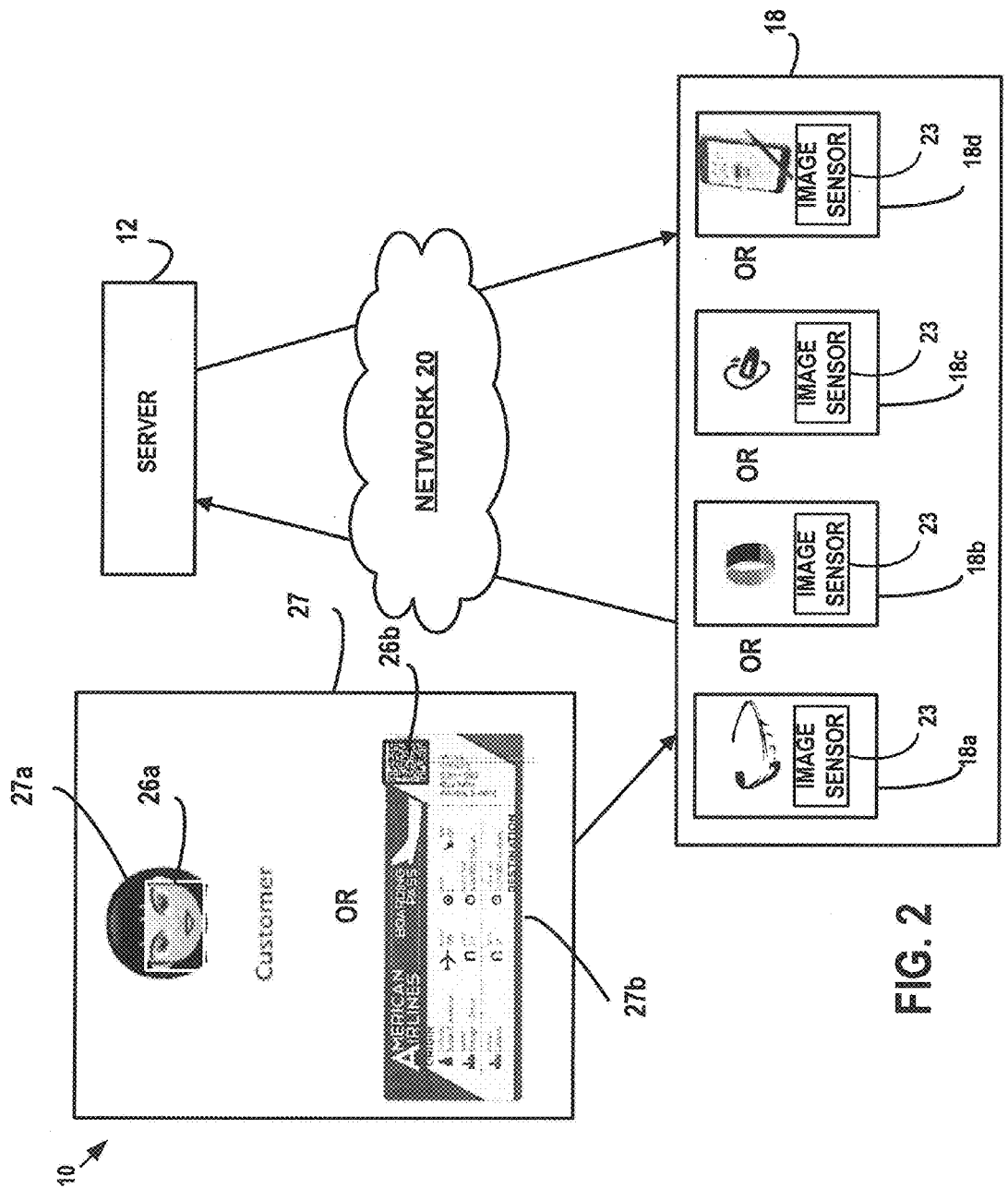
FIG. 2 is a diagrammatic illustration of an exemplary embodiment of the system of FIG. 1.

In an exemplary embodiment of the system 10, and as illustrated in FIG. 2 with continuing reference to FIG. 1, the portable user device 18 is, or includes, wearable computerized glasses 18a, a wearable computerized wrist device 18b, a wearable computerized earpiece 18c, or a mobile tablet 18d. The object 27 is either the customer 27a or the boarding pass 27b.

Figure 3:
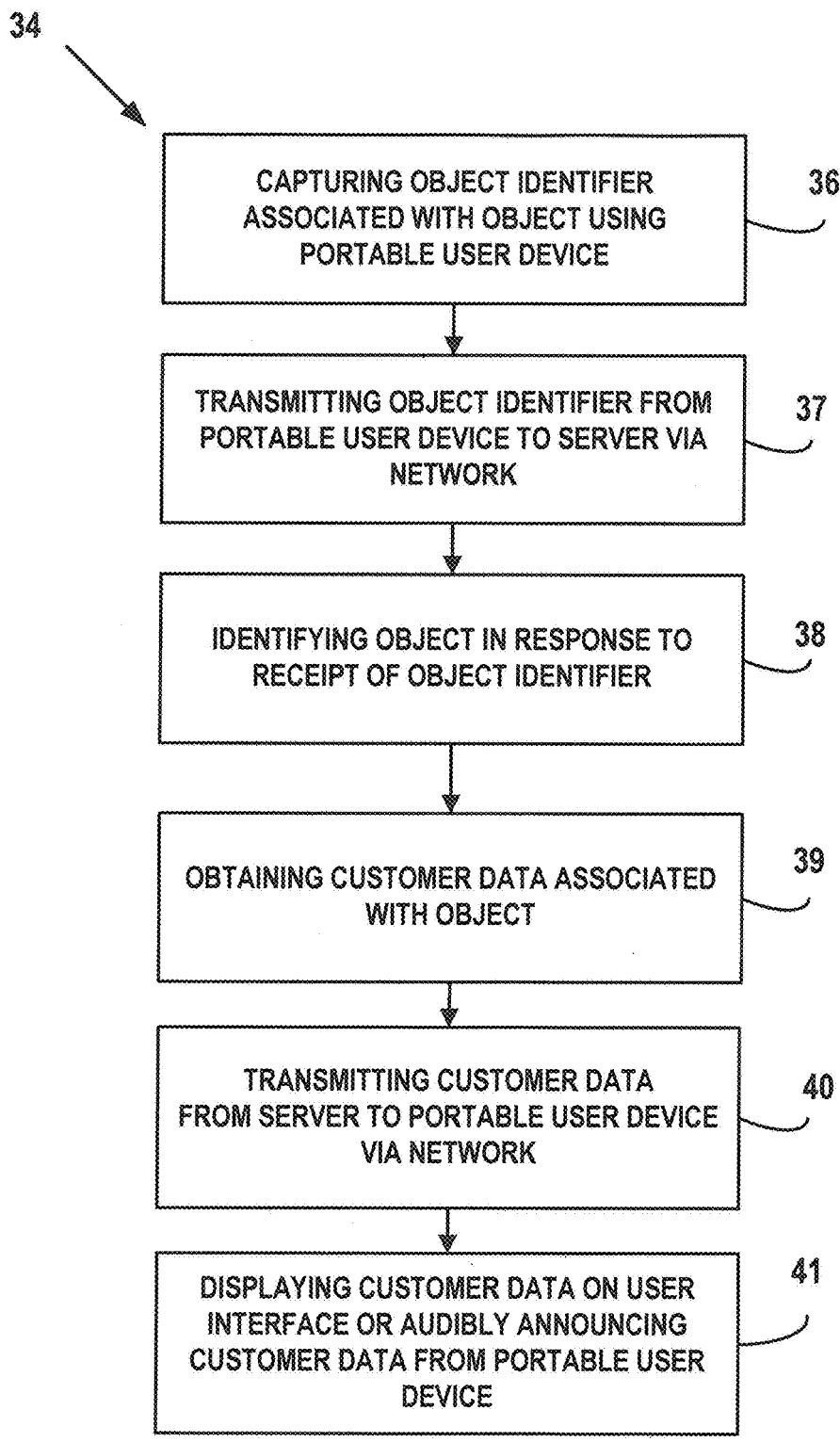
FIG. 3 is a flow chart illustration of a method of operating the system of FIG. 2, according to an exemplary embodiment.

In an exemplary embodiment, as illustrated in FIG. 3, a method of operating the system 10 illustrated in FIG. 2 to provide airline employees access to customer data while concurrently performing their work assignments is generally referred to by the reference numeral 34. The method 34 includes capturing the object identifier 26 associated with the object 27 using the portable user device 18, transmitting the object identifier 26 from the portable user device 18 to the server 12 via the network 20 at step 37, identifying the object 27 in response to the receipt of the object identifier 26 at step 38, obtaining customer data associated with the object 27 at step 39, transmitting the customer data from the server 12 to the portable user device 18 via the network 20 at step 40, and displaying the customer data on the user interface 25 or audibly announcing the customer data from the portable user device 18 at step 41.

At the step 36, the portable user device 18 captures the object identifier 26 associated with the object 27. The wearable computerized glasses 18a, the wearable computerized wrist device 18b, or the wearable computerized earpiece 18c is worn by the user such as, for example the airline employee, so that the object identifier 26 falls within the scope of the image sensor 23. For example, the wearable computerized glasses 18a are worn so that the scope of the image sensor 23 at least partially corresponds with the airline employee's scope of vision, thereby allowing the image sensor 23 to capture the object identifier 26 that is located within the airline employee's scope of vision. As the airline employee looks towards the object 27, or the customer 27a, the wearable computerized glasses 18a are pointed towards the customer 27a so that the image sensor 23 can capture the plurality of facial features 26a. Additionally, when the object 27 is the boarding pass and the object identifier 26 is a QR code 26b located on the boarding pass 27b, then when the airline employee looks towards the boarding pass 27b, the wearable computerized glasses 18a are pointed towards the boarding pass 27b. The image sensor 23 can then capture the QR code 26b located on the boarding pass 27b. In an exemplary embodiment, the mobile tablet 18d is held by the airline employee, and therefore, the airline employee can point the image sensor 23 of the mobile tablet 18d towards the object 27 to capture the object identifier 26. Similarly, the computerized wrist device 18b and the wearable computerized earpiece 18c can be pointed towards the object 27 to capture the object identifier 26.

In an exemplary embodiment and after the step 36, the portable user device 18 transmits the object identifier 26 from the portable user device 18 to the server 12 via the network 20 at the step 37. The wearable computerized glasses 18a, the wearable computerized wrist device 18b, the wearable computerized earpiece 18c, or the mobile tablet 18d transmits the plurality of facial features 26a or the QR code 26b via the network 20. In an exemplary embodiment, the identity of the application 24 is also transmitted to the server 12 via the network 20 at the step 37. The identity of the application 24 may include the name, job description, or employee identifier of the airline employee that is using the portable user device 18. In another exemplary embodiment, the airline employee can include additional data to be transmitted to the server 12 along with the object identifier 26. In another exemplary embodiment, transmission data is also transmitted along with the object identifier 26. Transmission data includes the time at which the object identifier 26 was sent to the server 12 or the location of the portable user device 18 when the object identifier 26 was captured by the portable user device 18.

In an exemplary embodiment and after the step 37, the system 10 illustrated in FIG. 2 identifies the object 27 in response to the receipt of the object identifier 26 at the step 38. The customer 27a is identified using the facial features 26a captured by the computerized wearable glasses 18a and the facial recognition software stored in the server 12 or the boarding pass 27b is identified using the QR code 26b captured by the computerized wearable glasses 18a and the QR decoding software stored in the server 12.

In an exemplary embodiment and after the step 38, the system 10 illustrated in FIG. 2 obtains customer data associated with the object 27 at the step 39. Customer data such as, for example, the customer's name, age, flight itinerary or schedule, loyalty program statistics, birthday, etc. is associated with each customer. Customer data can also include data relevant to the customer's flight itinerary such as, for example, a change to the customer's flight schedule, e.g., gate change, flight delay. In an exemplary embodiment, the type of customer data obtained is dependent upon the identity of the application 24 of the portable user device 18. For example, if the identity of the application 24 is associated with a flight attendant, then the customer data obtained will relate to data relevant to duties associated with the flight attendant. For example, the system 10 illustrated in FIG. 2 obtains customer data such as, for example, customer name and expected delays associated with the customer's upcoming flight when the identity of the application 24 is associated with the flight attendant, while the system 10 illustrated in FIG. 2 obtains customer data such as, for example, the customer's final destination and expected gate location of the customer's upcoming flight when the identity of the application 24 is associated with a baggage handler.

In an exemplary embodiment and after the step 39, the system 10 illustrated in FIG. 2 transmits the customer data from the server 12 to the portable user device 18 via the network 20 at the step 40.

In an exemplary embodiment and before, during or after the step 40, the customer data is displayed on the user interface 25 of the portable use device 18 or audibly announced from the portable user device 18 at the step 41. When the wearable computerized glasses 18a are worn by the airline employee, the user interface 25 is located within the scope of the airline employee's vision. Therefore, when the customer data is displayed on the user interface 25, the airline employee may read the customer data while concurrently performing his or her work related activities. Additionally, when the customer data is audibly announced from the wearable computerized earpiece 18c, the airline employee hears the customer data while concurrently performing his or her work related activities.

In an exemplary embodiment, the method 34 allows for the airline employee to access customer data while concurrently performing his or her work related activities.

Figure 4:
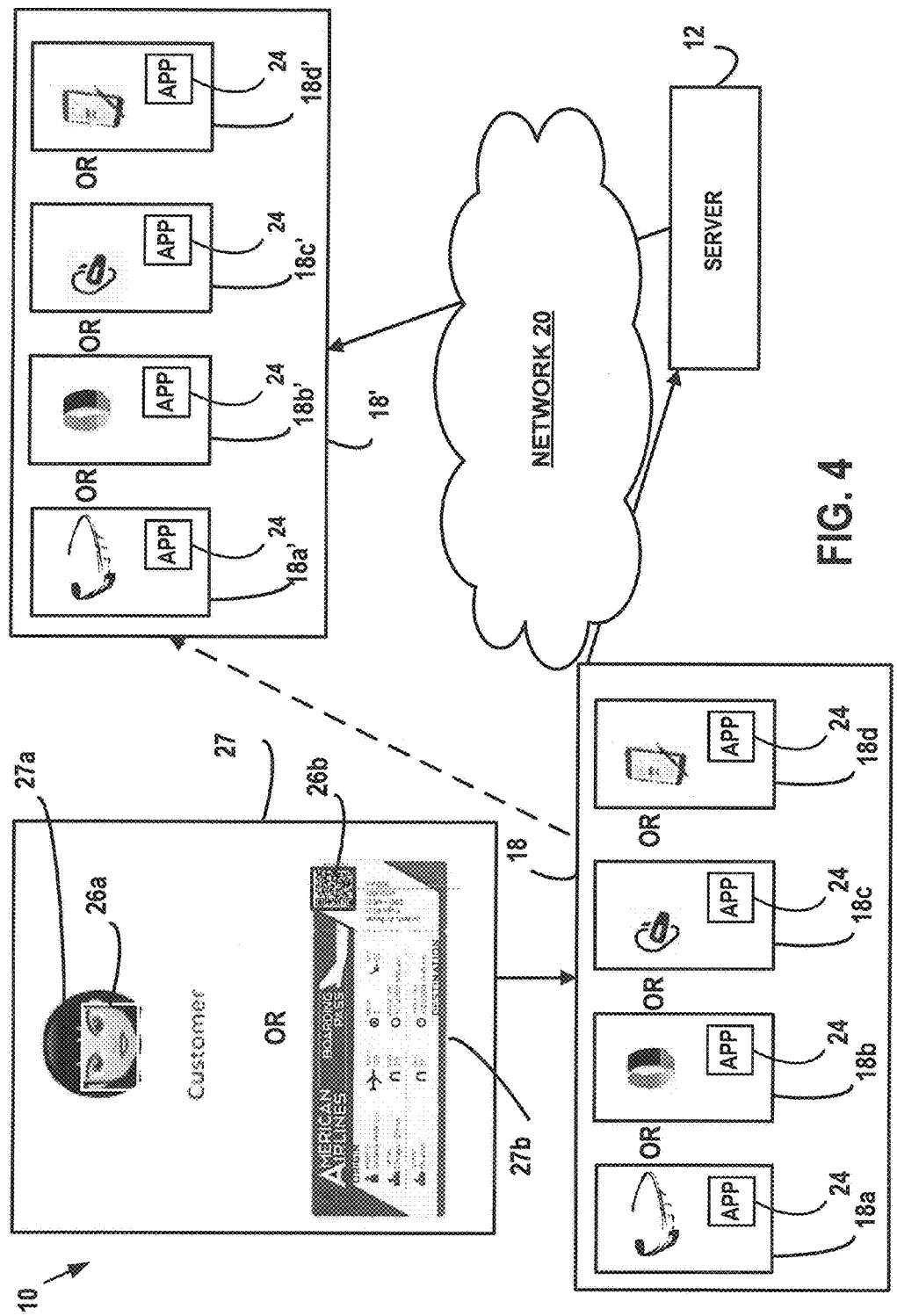
FIG. 4 is a diagrammatic illustration of another exemplary embodiment of the system of FIG. 1.

In another exemplary embodiment of the system 10, and as illustrated in FIG. 4, with continuing reference to FIGS. 1 and 2, the system 10 also includes another portable user device 18'. Similarly to the portable user device 18, the portable user device 18' is, or includes, wearable computerized glasses 18a', a wearable computerized wrist device 18b', a wearable computerized earpiece 18c', or a mobile tablet 18d'. The another portable user device 18' may be worn by another airline employee or the portable user device 18 and the another portable user device 18' may be worn by one airline employee.

Figure 5:
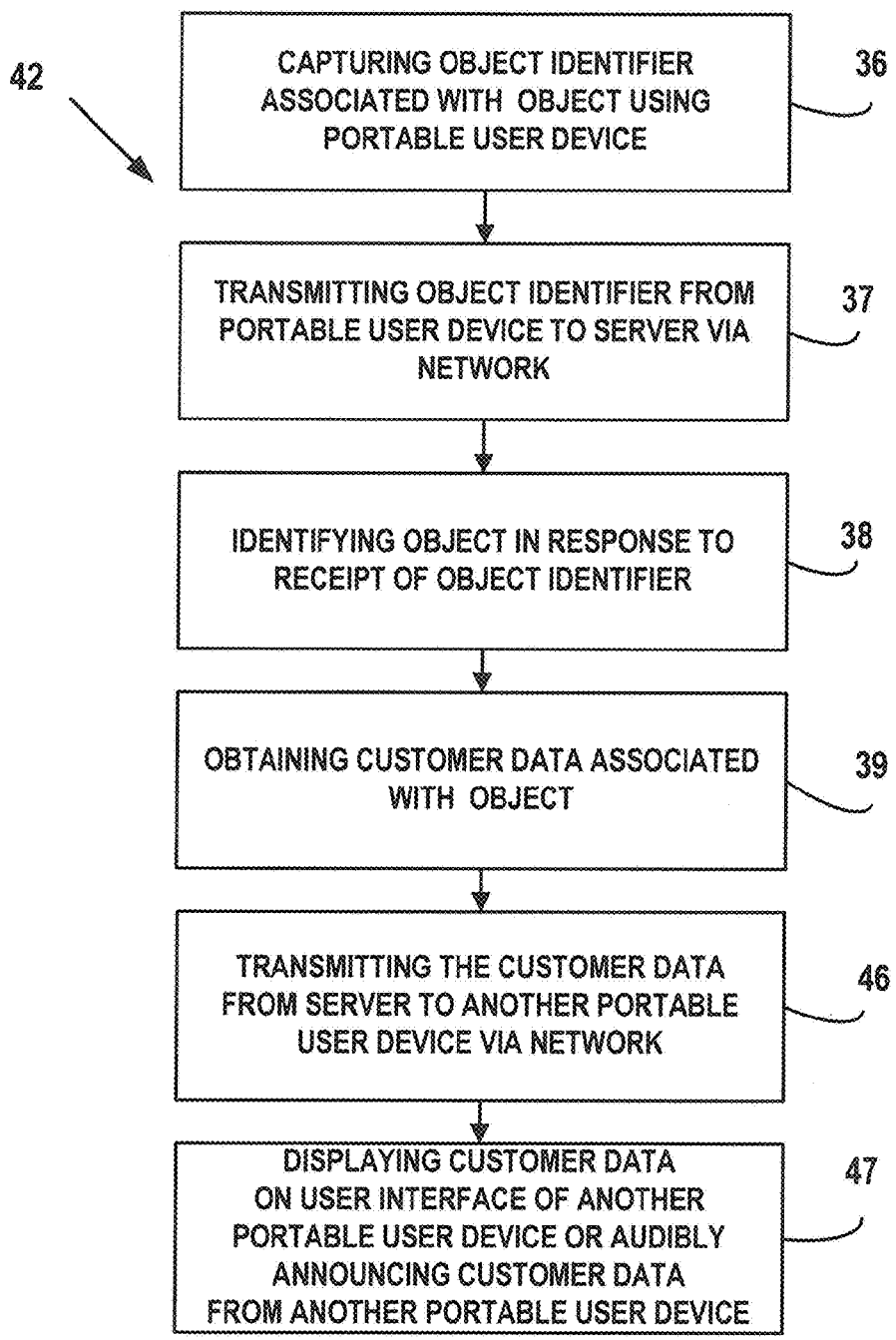
FIG. 5 is a flow chart illustration of a method of operating the system of FIG. 4, according to an exemplary embodiment.

As illustrated in FIG. 5, a method of operating the system 10 illustrated in FIG. 4 to provide airline employees access to customer data while concurrently performing their work assignments is generally referred to by the reference numeral 42. The method 42 is similar to the method 34 in that it includes the steps 36, 37, 38, and 39. However, the method 42 omits the steps 40 and 41; instead, the method 42 includes transmitting the customer data from the server 12 to the another portable user device 18' via the network 20 at step 46, and displaying the customer data on the user interface 25 of the another portable user device 18' or audibly announcing the customer data from the another portable user device 18' at step 47. As the steps 36-39 are described above, a detailed description will not be provided here. After the step 39, the system 10 illustrated in FIG. 4 transmits the customer data from the server 12 to the another portable user device 18' via the network 20 at the step 46. Transmitting the customer data from the server 12 to the another portable user device 18' at the step 46 is substantially similar to transmitting the customer data from the server 12 to the portable user device 18 at the step 40. After the step 46, the customer data is displayed on the user interface 25 of the another portable user 18' or audibly announced from the portable user device 18' at the step 47. Displaying the customer data on the user interface 25 of the another portable user device 18', or audibly announcing the customer data from the another portable user device 18', at the step 47 is substantially similar to displaying the customer data on the user interface 25 of the portable user device 18, or audibly announcing the customer data from the portable user device 18, at the step 41.

In an exemplary embodiment, the method 42 allows for the employee to access customer data while concurrently performing their work assignments using a plurality of portable user devices 18 and/or allows for multiple employees to access customer data while concurrently performing their work assignments.

Figure 6:
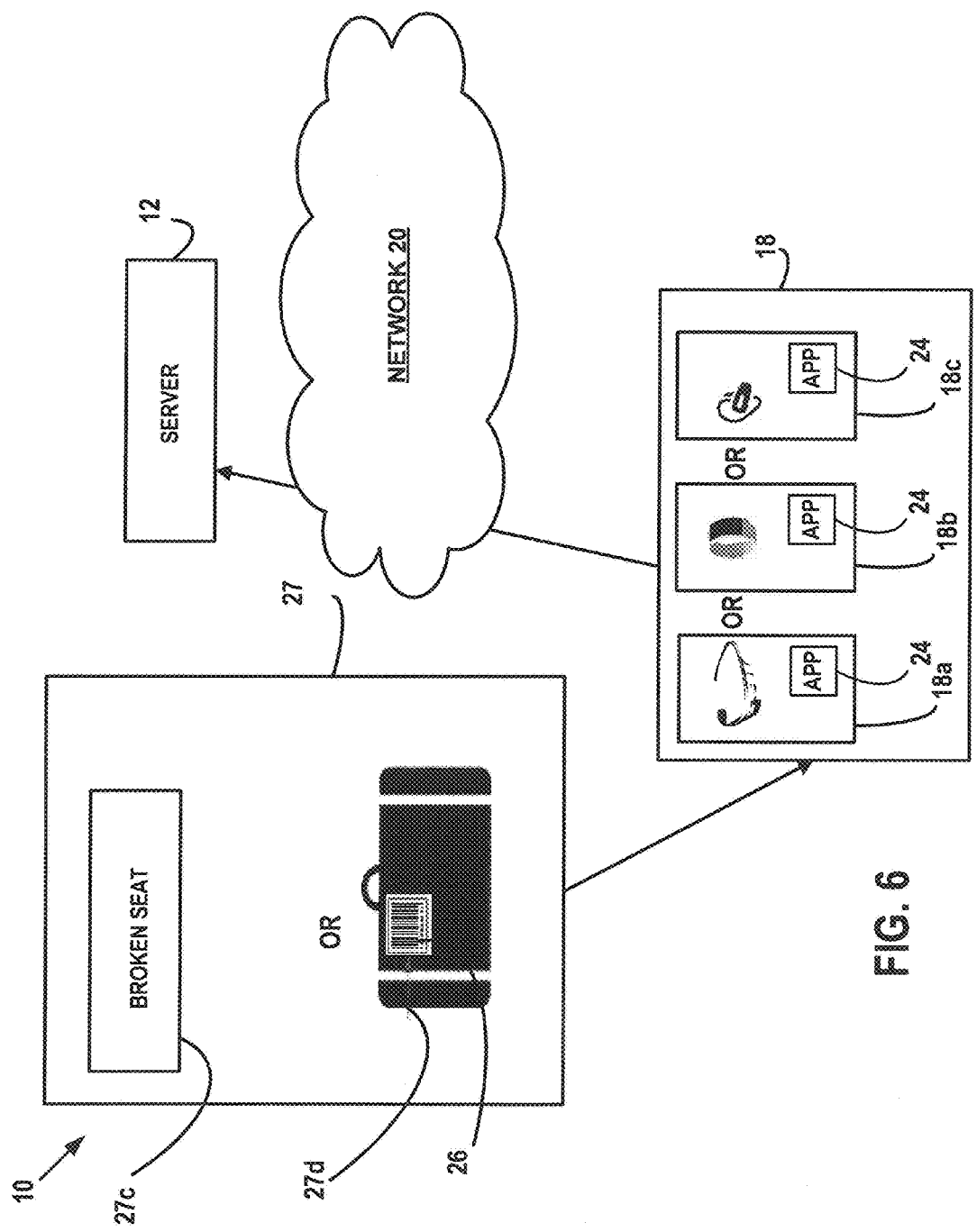
FIG. 6 is a diagrammatic illustration of yet another exemplary embodiment of the system of FIG. 1.

In another exemplary embodiment of the system 10, as illustrated in FIG. 6, the object 27 is an item that requires attention or maintenance such as, for example, a broken seat 27c, or is a piece of baggage 27d having a barcode 26d as the object identifier 26, and the portable user device 18 is, or includes, the wearable computerized glasses 18a or the wearable computerized wrist device 18b or the wearable computerized earpiece 18c. A method of operating the system 10 illustrated in FIG. 6 includes the steps 36, 37, and 38 from the method 34. In an exemplary embodiment, the system 10 illustrated in FIG. 6 may transmit the object identifier 26, the identity of the application 24, and status data, to the server 12 to update the data stored within the server 12. For example, Baggage Handler "A" is associated with the identity of the application 24 and captures the barcode 26d located on the piece of baggage 27d at 1:30 pm, using the computerized wearable wrist device 18b, while loading the piece of baggage 27d onto the airplane at the step 36. The status data is the status of "baggage loaded." The computerized wearable wrist device 18b transmits the barcode 26d or data associated with the barcode 26d to the sever 12 via the network 20, along with the identity of the application 24 associated with the computerized wearable wrist device 18b and the status data of "baggage loaded" at the step 37. Additionally, the transmission data such as, for example, a time stamp and/or other information, may also be transmitted to the server 12 at the step 37. As detailed above, the barcode 26d, or data associated with the barcode, the identity of the application 24, and the status of "baggage loaded" are received by the server 12 so that the server 12 can identify the piece of baggage 27 and the identity of the application 24 at the step 38. The received data is stored in the server 12. Therefore, data relating to the piece of baggage 27d that is stored in the server 12 is updated to reflect that the piece of baggage 27d has a status of "baggage loaded" on the airplane by Baggage Handler A at 1:30 pm. Alternatively, the portable user device 18 may capture a status of the item that requires attention or maintenance and transmit the status data to update the data stored within the server 12. For example, the employee notices the broken seat 27c. She or he then takes a picture of the broken seat 27c using the image sensor 23, thereby capturing the object identifier 26 of the seat 27c, notes the seat's location and the status of broken, and then transmits the object identifier 26 and the status data to the server 12. The server 12 then identifies the broken seat 27c based on the object identifier 26 within the picture of the broken seat 27c, and updates data relating to upcoming repairs or required action items in response to the receipt of the status data. In an exemplary embodiment, the status data is associated with a location of a piece of baggage or a stage of transit of a piece of baggage such as, for example, within check-in area, awaiting sorting, located in sorting, en route to terminal or the airplane, awaiting loading, baggage loaded, in flight, awaiting unloading, unloaded, en route to baggage terminal, located at baggage terminal. In an exemplary embodiment, status data is associated with a readiness of the airplane for departure or for arrival, or is associated with a need for repair or maintenance of an object 27.

Figure 7:
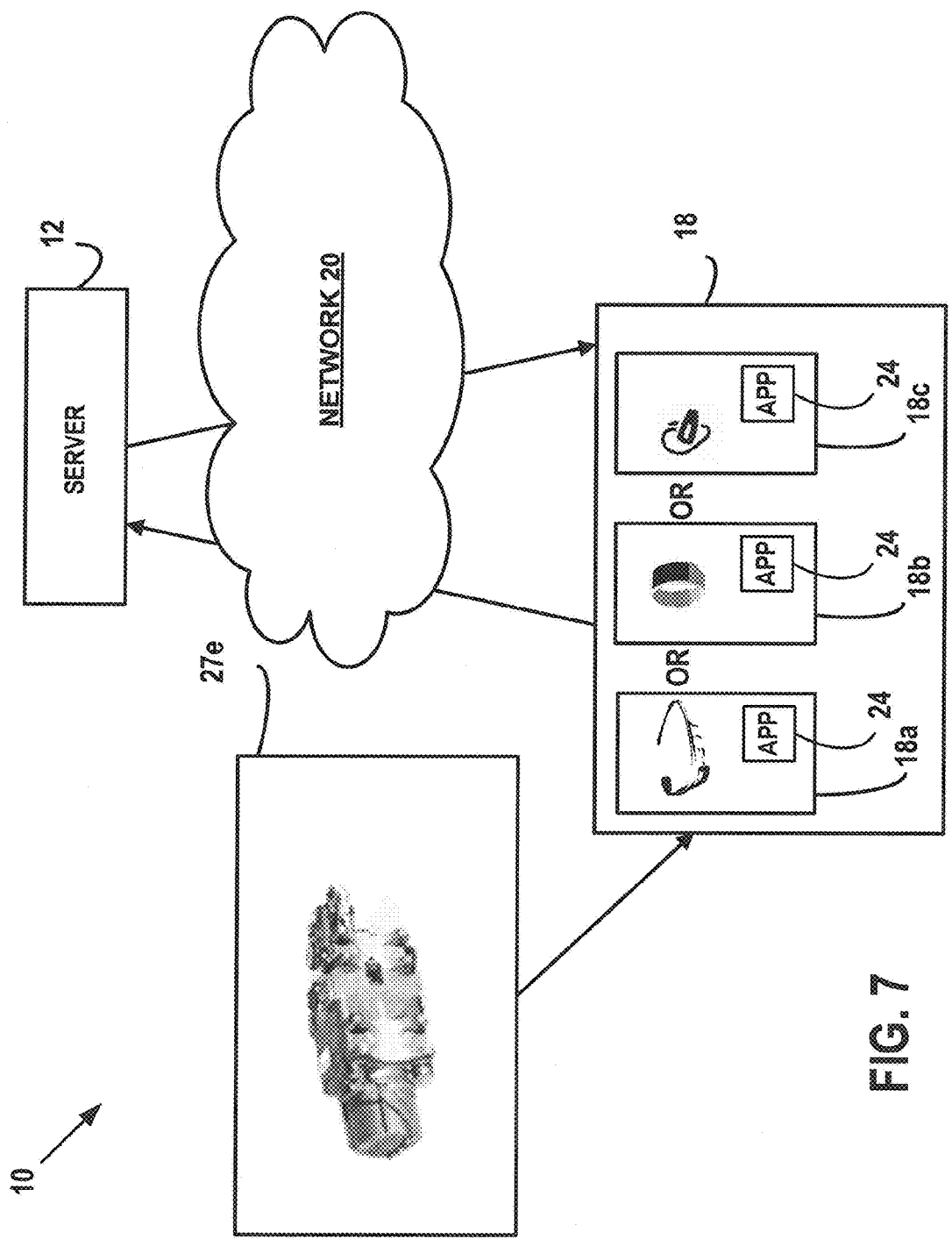
FIG. 7 is a diagrammatic illustration of still yet another exemplary embodiment of the system of FIG. 1.

In another exemplary embodiment of the system 10, as illustrated in FIG. 7, with continuing reference to FIG. 1, the object 27 is a portion of the airplane, a mechanical part of the airplane, a fixture of the airplane, a system of the airplane, or some other airplane-related object 27e. The portable user device 18 is, or includes, the wearable computerized glasses 18a, the wearable computerized wrist device 18b, or the wearable computerized earpiece 18c.

Figure 8:
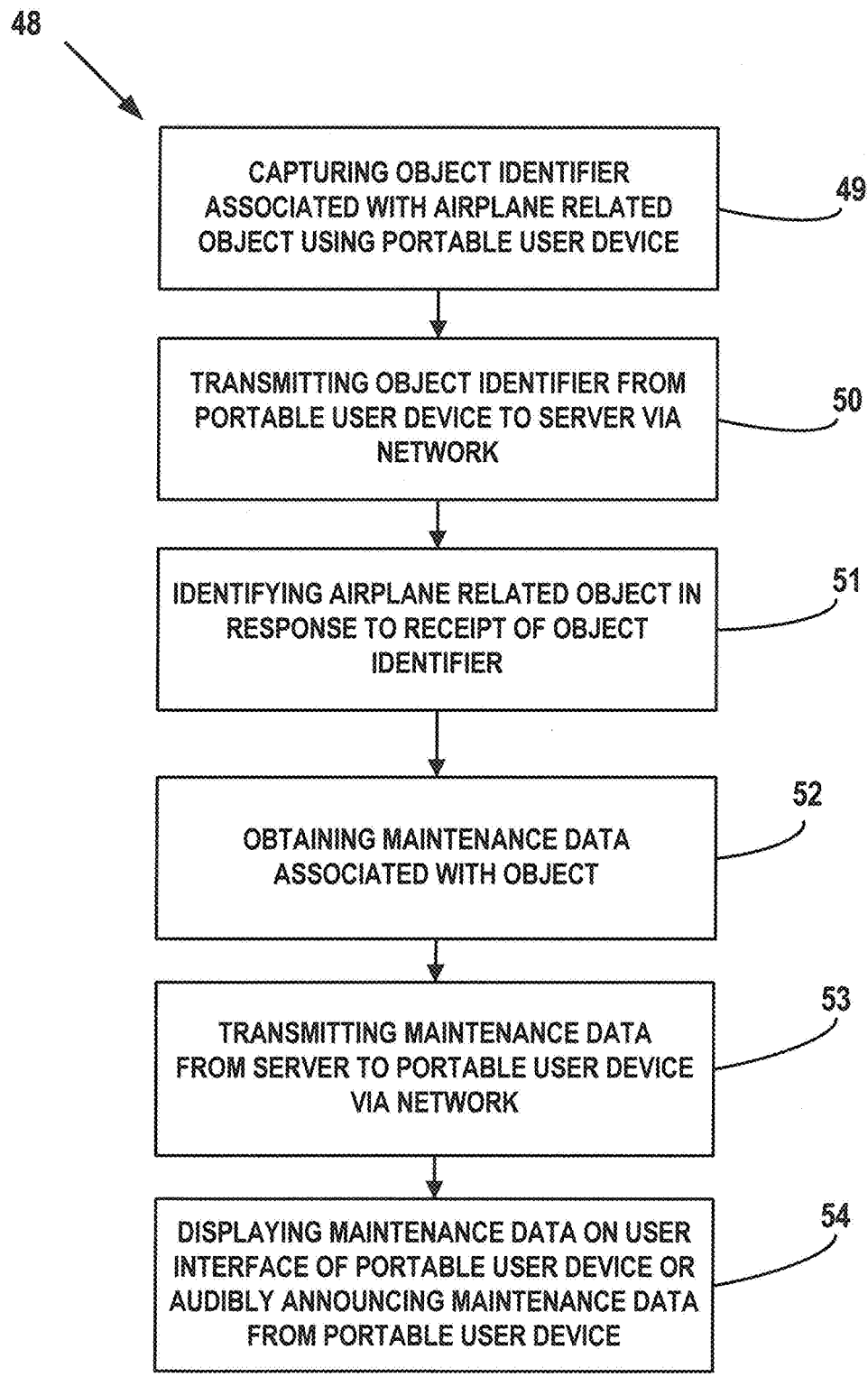
FIG. 8 is a flow chart illustration of a method of operating the system of FIG. 7, according to an exemplary embodiment.

In another exemplary embodiment, as illustrated in FIG. 8, a method of operating the system 10 illustrated in FIG. 7 to provide airline employees access to maintenance data while concurrently performing maintenance activities is generally referred to by the reference numeral 48. The method 48 is similar to the method 34 but the object 27 is the airplane-related object 27e and the data transmitted and displayed on the portable user device 18 is the maintenance data instead of the customer data.

At step 49, the object identifier 26 associated with the airplane-related object 27e is captured using the portable user device 18. For example, the user can be a mechanic that wears the computerized wearable glasses 18a while performing repairs or routine maintenance to the airplane-related object 27e. The mechanic can capture the object identifier 26 associated with the airplane-related object 27e such as, for example, the plurality of dimensions, using the computerized wearable glasses 18a. The capturing of the object identifier 26 associated with the airplane-related object 27e at the step 49 is substantially similar to the capturing of the object identifier 26 associated with the object 27 at the step 36.

In an exemplary embodiment and after the step 49, the object identifier 26 is transmitted from the portable user device 18 to the server 12 via the network 20 at step 50. The step 50 is substantially similar to the step 38.

In an exemplary embodiment and after the step 50, the system 10 illustrated in FIG. 7 identifies the airplane-related object 27e in response to the receipt of the object identifier 26 at step 51. The image-recognition software may be implemented at the server 12 to identify the airplane-related object 27e at the step 51.

In an exemplary embodiment and after the step 51, the system 10 illustrated in FIG. 7 obtains maintenance data associated with the airplane-related object 27e at step 52. As noted above, the server 12 contains data relating to maintenance and repairs of airplanes and airplane parts such as, for example, maintenance manuals, etc. After the airplane-related object 27e is identified by the system 10 illustrated in FIG. 7, the system 10 illustrated in FIG. 7 obtains relevant maintenance data such as, for example, the maintenance manual corresponding to the airplane-related object 27e.

In an exemplary embodiment and after the step 52, the system 10 illustrated in FIG. 7 transmits the maintenance data from the server 12 to the portable user device 18 via the network 20 at step 53. For example, the system 10 illustrated in FIG. 7 can transmit the maintenance manual or maintenance instructions corresponding to the airplane-related object 27e when the mechanic is looking at the airplane-related object 27e. The transmission of the maintenance data to the portable user device 18 at the step 53 is substantially similar to the transmission of the customer data to the portable user device 18 at the step 42.

In an exemplary embodiment and after the step 53, the portable user device 18 displays the maintenance data on the user interface 25 or audibly announces the maintenance data from the portable user device 18 at step 54. For example, as the mechanic is looking at an airplane-related object 27e, step-by-step instructions relating to the maintenance of the airplane-related object 27e can be displayed on the user interface 25 of the computerized wearable glasses 18a, thereby allowing the mechanic to perform maintenance on the airplane-related object 27e while simultaneously viewing the maintenance data. This allow for hands-free reference of maintenance data by the airline employee. The display of the maintenance data on the user interface 25 or audible announcement of the maintenance data from the portable user device 18 at the step 54 is substantially similar to the display of the customer data on the user interface 25 or audible announcement of the customer data from the portable user device 18 at the step 44.

Figure 9:
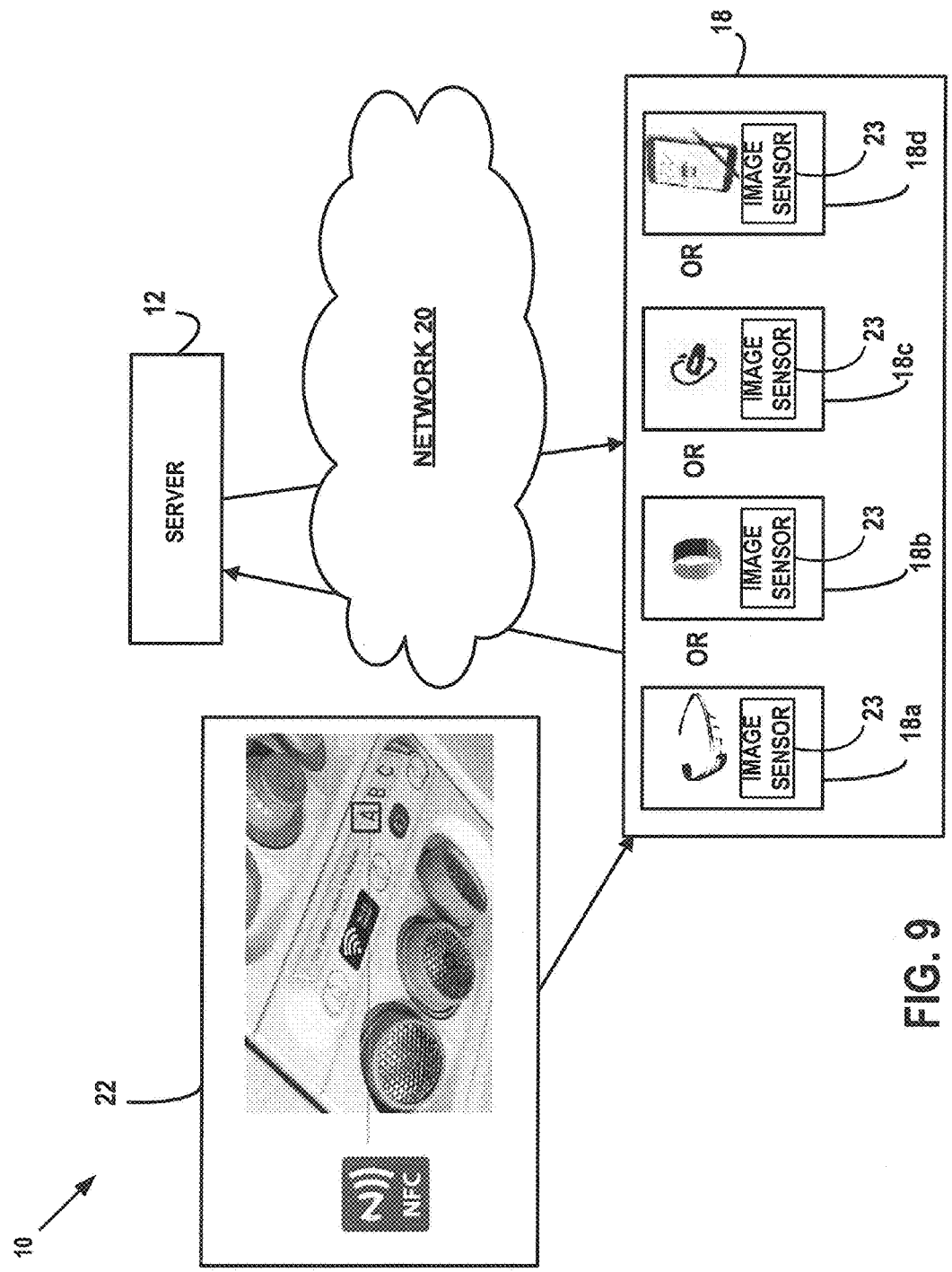
FIG. 9 is a diagrammatic illustration of still yet another exemplary embodiment of the system of FIG. 1.

In an exemplary embodiment of the system 10, as illustrated in FIG. 9 with continuing reference to FIG. 1, the portable user device 18 is, or includes, the wearable computerized glasses 18a, the wearable computerized wrist device 18b, the wearable computerized earpiece 18c, or the mobile tablet 18d. In an exemplary embodiment, the NFC tag 22 is coupled to the visual seat identifier of the seat located in the airplane. The seat located in the airplane is assigned to the customer for the duration of a flight of the airplane.

Figure 10:
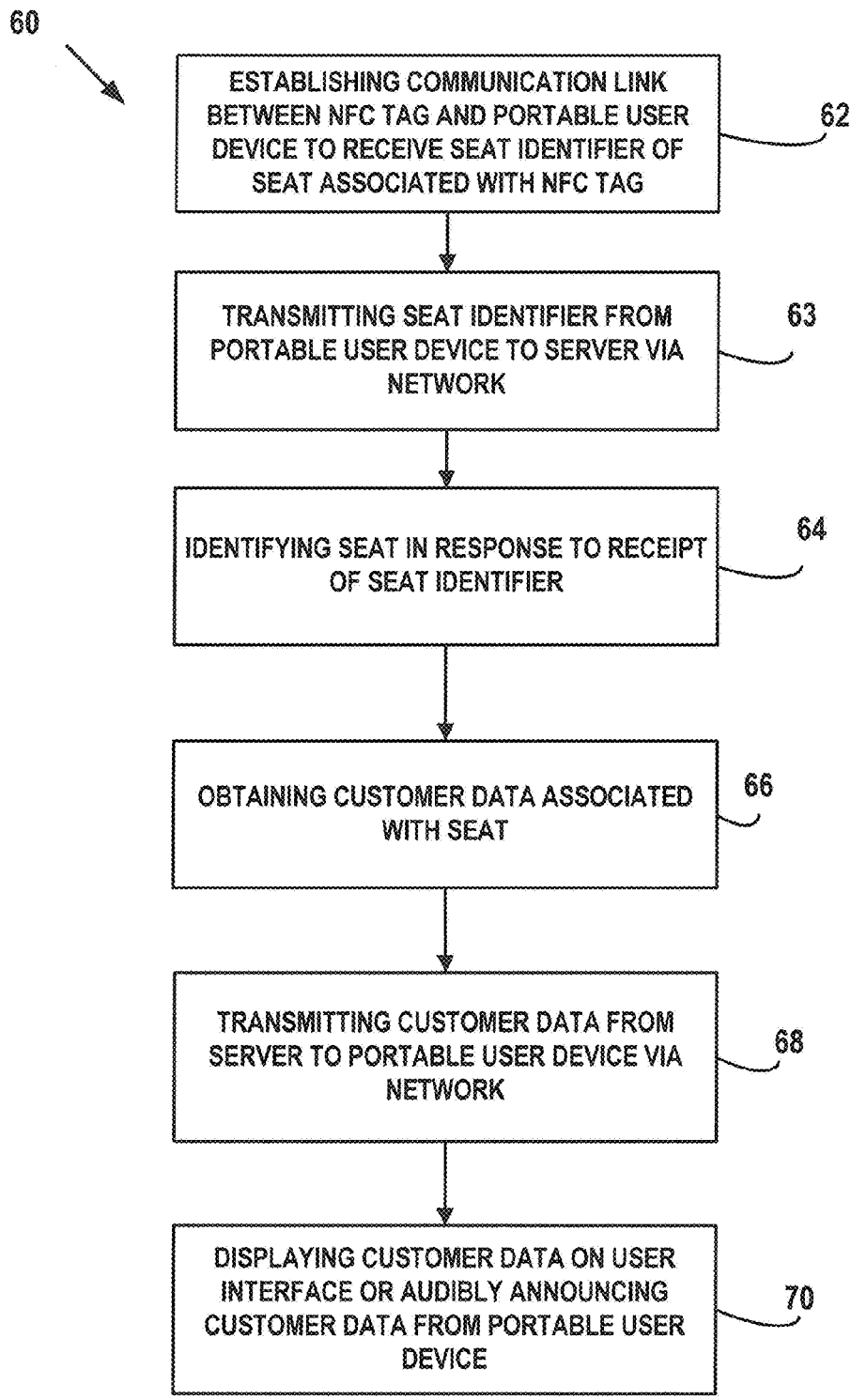
FIG. 10 is a flow chart illustration of a method of operating the system of FIG. 9, according to an exemplary embodiment.

In an exemplary embodiment, as illustrated in FIG. 10, a method of operating the system 10 illustrated in FIG. 9 to provide airline employees access to customer data while concurrently performing their work assignments is generally referred to by the reference numeral 60. The method 60 includes establishing a communication link between the NFC tag 22 and the portable user device 18 to receive the seat identifier of the seat associated with the NFC tag 22 at step 62, transmitting the seat identifier from the portable user device 18 to the server 12 via the network 20 at step 63, identifying the seat in response to the receipt of the seat identifier at step 64, obtaining customer data associated with the seat at step 66, transmitting the customer data from the server 12 to the portable user device 18 via the network 20 at step 68, and displaying the customer data on the user interface 25 or audibly announcing the customer data from the portable user device 18 at step 70.

At the step 62, the portable user device 18 establishes a communication link between the NFC tag 22 and the portable user device 18 to receive the seat identifier of the seat associated with the NFC tag 22. In an exemplary embodiment, the user of the portable user device 18 "bumps" or "taps" the NFC tag 22 to establish the communication link between the NFC tag 22 and the portable user device 18. For example, the airline employee could "bump" the wearable computerized wrist device 18b against the NFC tag 22, which is located at or near the seat. In another embodiment, the communication link is automatically established upon detection of the NFC tag 22 by the portable user device 18.

In an exemplary embodiment and after the step 62, the portable user device 18 transmits the seat identifier to the server 12 via the network 20 at the step 63. Transmitting the seat identifier to the server 12 via the network 20 at the step 63 is substantially similar to transmitting the object identifier from the portable user device 18 to the server 12 via the network 20 at the step 37.

In an exemplary embodiment and after the step 63, the system 10 illustrated in FIG. 9 identifies the seat in response to the receipt of the seat identifier at step 64.

In an exemplary embodiment and after the step 64, the system 10 illustrated in FIG. 9 obtains the customer data associated with the seat at the step 66. As the seat is assigned to the customer, the customer data associated with the customer assigned to the seat is associated with the seat. Obtaining the customer data associated with the seat at the step 66 is substantially similar to obtaining the customer data associated with the object 27 at the step 39.

In an exemplary embodiment and after the step 66, the system 10 illustrated in FIG. 9 transmits the customer data from the server 12 to the portable user device 18 via the network 20 at the step 68. Transmitting the customer data from the server 12 to the portable user device 18 at the step 68 is substantially similar to transmitting the customer data from the server 12 to the portable user device 18 via the network 20 at the step 40.

In an exemplary embodiment and after the step 68, the portable user device 18 displays the customer data on the user interface 25 or audibly announces the customer data from the portable user device 18 at the step 70. Displaying the customer data on the user interface 25 or audibly announcing the customer data from the portable user device 18 at the step 70 is substantially similar to displaying the customer data on the user interface 25 or audibly announcing the customer data from the portable user device 18 at the step 41.

In an exemplary embodiment, the method 60 allows for the airline employee to quickly and efficiently access customer data while concurrently performing work related activities.

Figure 11:
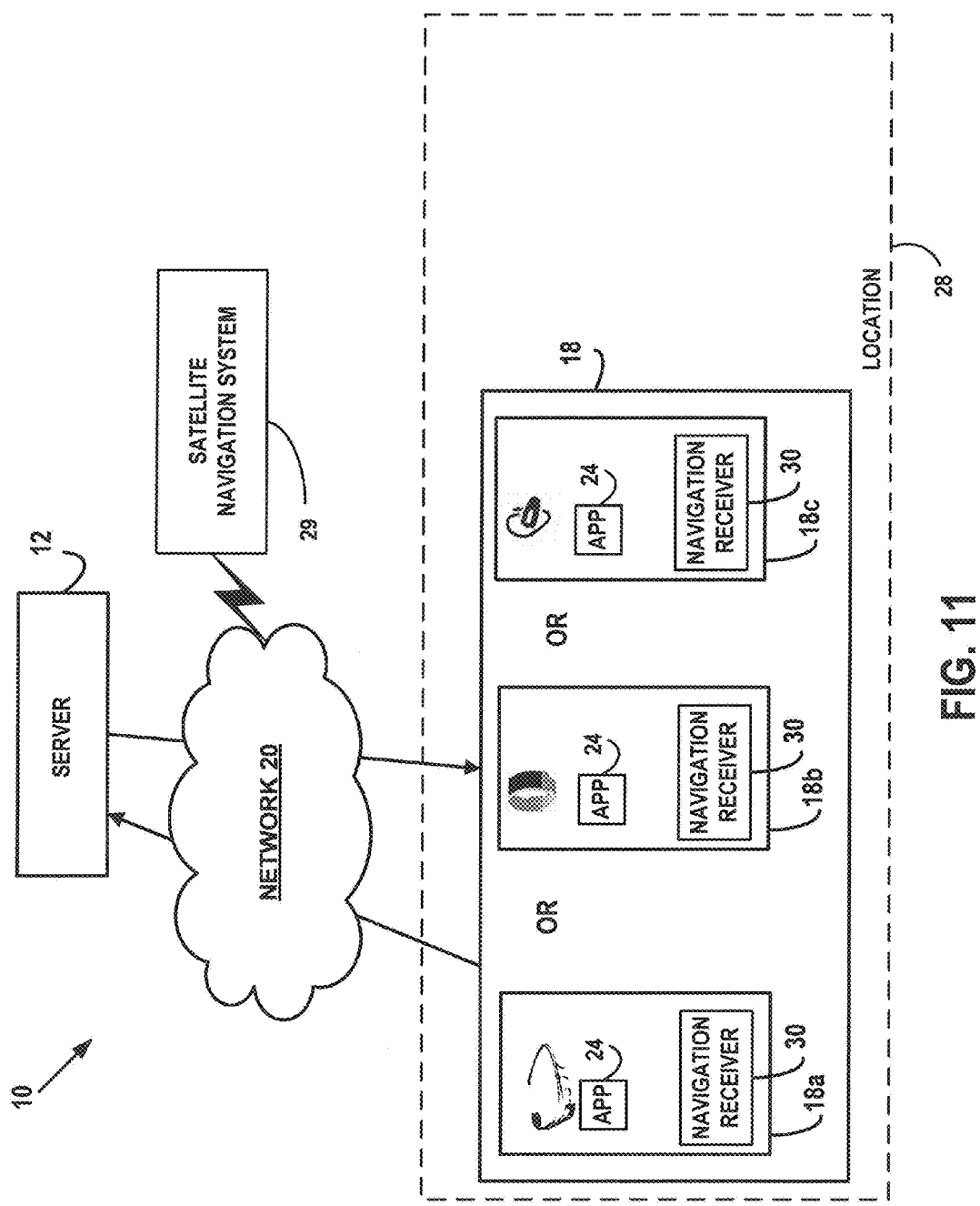
FIG. 11 is a diagrammatic illustration of still yet another exemplary embodiment of the system of FIG. 1.

In an exemplary embodiment of the system 10, as illustrated in FIG. 11 with continuing reference to FIG. 1, the portable user device 18 is, or includes, the wearable computerized glasses 18a, the wearable computerized wrist device 18b, or the wearable computerized earpiece 18c. In an exemplary embodiment, the portable user device 18 is in communication with the satellite navigation system 29 via the network 20. In an exemplary embodiment, the location 28 is the airport, or a location within the airport such as, for example, a terminal, gate, or parking lot. The portable user device 18 is located within the location 28.

Figure 12:
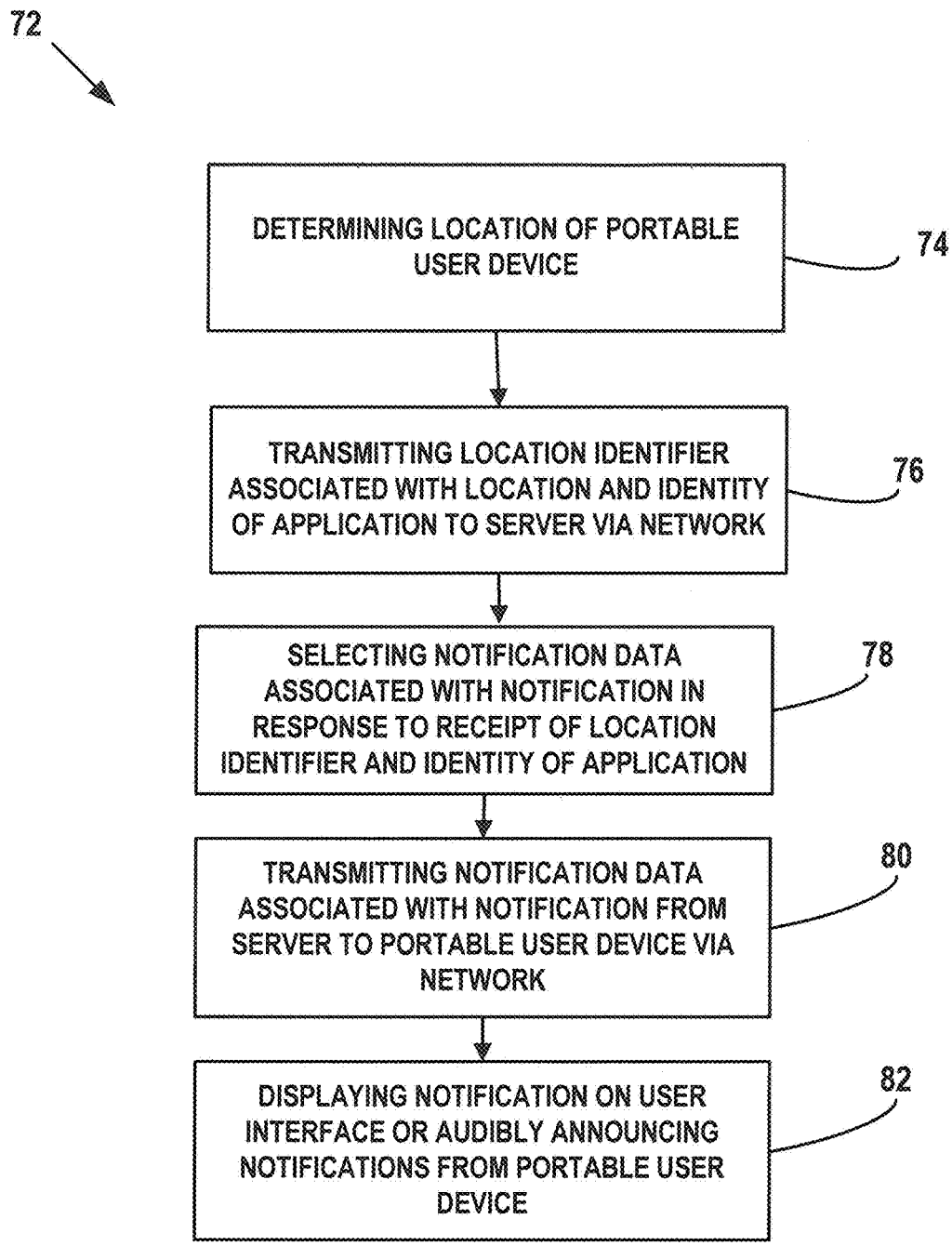
FIG. 12 is a flow chart illustration of a method of operating the system of FIG. 11, according to an exemplary embodiment.

In an exemplary embodiment, as illustrated in FIG. 12, a method of operating the system 10 illustrated in FIG. 11 to provide a notification to the user is generally referred to by the reference numeral 72. The method 72 includes determining the location 28 of the portable user device 18 at step 74, transmitting a location identifier associated with the location 28 and the identity of the application 24 to the server 12 via the network 20 at step 76, selecting notification data associated with a notification in response to the receipt of the location identifier and the identity of the application 24 at step 78, transmitting the notification data associated with the notification from the server 12 to the portable user device 18 via the network 20 at step 80, and displaying the notification on the user interface 25 or audibly announcing the notification from the portable user device 18 at step 82.

At the step 74, the application 24 determines the location 28 of the portable user device 18. In an exemplary embodiment, the application 24 may determine that the portable user device 18 is located at the airport using the navigation receiver 30 and the satellite navigation system 29 of the portable device 18. The navigation receiver 30 communicates with the satellite navigation system 29 to determine the location 28 of the receiver 30 and thus the portable device 18 and the user thereof. The application 24 communicates with the receiver 30 to determine the location 28 of the receiver 30 and thus the portable device 18 and the user thereof. In an exemplary embodiment, the application 24 may determine that the user is located at the location 28 using geofencing, that is, by determining whether the portable device 18 and thus the user thereof has entered a geographic area having a defined perimeter, the coordinates of which are stored, in several exemplary embodiments, in the computer readable medium of the portable device 18 and/or the computer readable medium 14 of the application server 12. The coordinates of the defined perimeter may correspond to the boundaries of the airport, and/or a narrower area (such as a gate or terminal) within the airport. The navigation receiver 30 communicates with the satellite navigation system 29 to determine the location 28 of the receiver 30 and thus the portable device 18 and the user thereof, and the application 24 and/or the application server 12 determine whether the location 28 of the receiver 30 is within the geographic area having the defined perimeter for which the coordinates are stored.

In an exemplary embodiment and after the step 74, the system 10 illustrated in FIG. 11 transmits a location identifier associated with the location 28 and the identity of the application 24 to the server 12 via the network 20 at the step 76. In an exemplary embodiment, the portable user device 18 associates a location identifier with the location 28. In an exemplary embodiment, the application 24 is associated with an identity of the application 24. Both the location identifier and the identity of the application 24 are transmitted to the server 12 via the network 20.

In an exemplary embodiment and after the step 76, the system 10 illustrated in FIG. 11 selects notification data that relates to a notification in response to the receipt of the location identifier and the identity of the application 24 at the step 78. In an exemplary embodiment, the identity of the application 24 is associated with the customer. For example, the system 10 illustrated in FIG. 11 identifies the customer associated with the identity of the application 24. The system 10 illustrated in FIG. 11 can then access customer data such as, for example, a flight schedule associated with the customer. Using the customer's flight schedule information and data relating to scheduling and airline operations stored in the server 12, the system 10 illustrated in FIG. 11 selects notification data relevant to the customer such as, for example, notification data that relates to a notification that the gate at which the customer will be boarding the airplane has changed. In an exemplary embodiment, the selection of notification data can also be in response to operational and employee-related events. For example, in response to an operational related events such as, for example, a cross-check event, notification data that relates to a notification of "prepare flight for takeoff" may be selected. An example of an employee-related event is when training becomes due for a specific employee and the notification data selected is associated with a notification of "Training is due."

In an exemplary embodiment and after the step 78, the system 10 illustrated in FIG. 11 transmits the notification data associated with the notification from the server 12 to the portable user device 18 via the network 20 at the step 80. Transmitting the notification data from the server 12 to the portable user device 18 via the network 20 at the step 78 is substantially similar to transmitting the customer data from the server 12 to the portable user device 18 via the network at the step 40.

In an exemplary embodiment and after the step 80, the portable user device 18 displays the notification on the user interface 25 or audibly announces the notification at the step 82. For example, the notification is displayed, using the customer's cell phone, to notifying the customer that the gate at which the customer will be boarding the airplane has been changed. In an exemplary embodiment, the notification is a visual or an audible notification.

In several embodiments, use of the system 10 or completion of at least a portion of the method 34, 42, 48, 60 or 72 allows airline employees to perform tasks more efficiently than existing methods. Additionally, use of the system 10 or completion of at least a portion of the method 34, 42, 48, 60 or 72 results in faster and less intrusive lookup of customer data, thereby enabling airline workers to deliver a better customer experience. Moreover, use of the system 10 or completion of at least a portion of the methods 34, 42, 48, 60 or 72 results in improved productivity and multi-tasking due to "hands free" wearable device operation. Use of the system 10 or completion of at least a portion of the method 34, 42, 48, 60 or 72 can also result in the airline employee and/or the customer quickly observing and acting on critical alerts and information transmitted to the portable user device 18.

In an exemplary embodiment, the system 10 illustrated in FIG. 7 may also include the another portable user device 18'. The another portable user device 18' may be the wearable computerized glasses 18a', the wearable computerized wrist device 18b', the wearable computerized earpiece 18c', or the mobile tablet 18d'. The another portable user device 18' is worn by another user. The system 10 illustrated in FIG. 7 transmits the maintenance data from the server 12 to the another portable user device 18' via the network 20 and displays the maintenance data on, or audibly announces the maintenance data from, the another portable user device 18'. Information can be communicated between the user and the another user through the portable user device 18 and the another portable user device 18' to enable employees to collaborate and consult among themselves.

In several exemplary embodiments, any one of the methods 34, 42, 48, 60 and 72 is initiated upon the user tapping or otherwise touching the portable user device 18, speaking a verbal command that is processed by speech recognition systems, or other suitable methods.

In several exemplary embodiments, the object identifier 26 is not transmitted from the portable user device 18 to the server 12 via the network 20. Instead, the portable user device 18 is used to identify the object 27 in response to the capture of the object identifier 26. After the portable user device 18 identifies the object 27, the portable user device 18 obtains customer data associated with the object 27. The customer data is then transmitted from the portable user device 18 to the another portable user device 18'.

Figure 13:
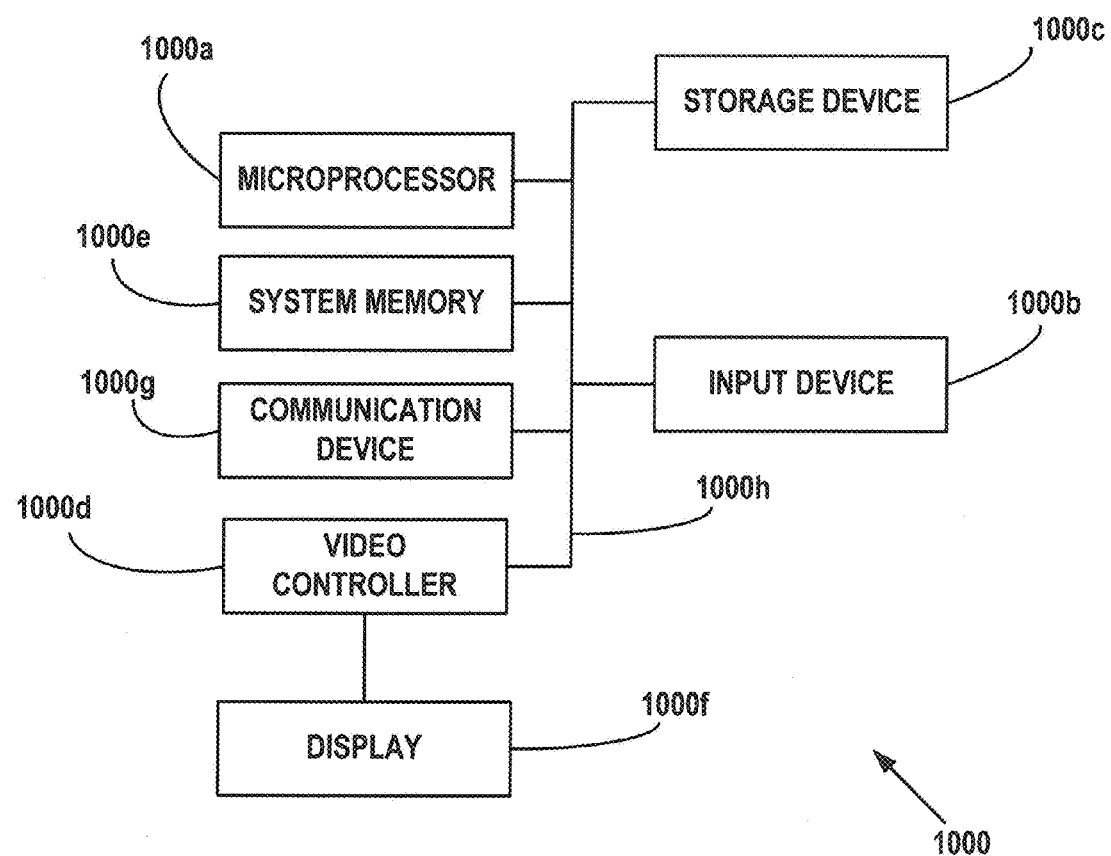
FIG. 13 is a diagrammatic illustration of a node for implementing one or more exemplary embodiments of the present disclosure, according to an exemplary embodiment.

In an exemplary embodiment, as illustrated in FIG. 13 with continuing reference to FIGS. 1, 2, 3, 4, 5, 6, 7, 8, 9, 10, 11, and 12, an illustrative node 1000 for implementing one or more embodiments of one or more of the above-described networks, elements, methods and/or steps, and/or any combination thereof, is depicted. The node 1000 includes a microprocessor 1000a, an input device 1000b, a storage device 1000c, a video controller 1000d, a system memory 1000e, a display 1000f, and a communication device 1000g all interconnected by one or more buses 1000h. In several exemplary embodiments, the storage device 1000c may include a floppy drive, hard drive, CD-ROM, optical drive, any other form of storage device and/or any combination thereof. In several exemplary embodiments, the storage device 1000c may include, and/or be capable of receiving, a floppy disk, CD-ROM, DVD-ROM, or any other form of computer-readable medium that may contain executable instructions. In several exemplary embodiments, the communication device 1000g may include a modem, network card, or any other device to enable the node to communicate with other nodes. In several exemplary embodiments, any node represents a plurality of interconnected (whether by intranet or Internet) computer systems, including without limitation, personal computers, mainframes, PDAs, smartphones and cell phones.

In several exemplary embodiments, one or more of the components of any of the above-described systems include at least the node 1000 and/or components thereof, and/or one or more nodes that are substantially similar to the node 1000 and/or components thereof. In several exemplary embodiments, one or more of the above-described components of the node 1000 and/or the above-described systems include respective pluralities of same components.

In several exemplary embodiments, a computer system typically includes at least hardware capable of executing machine readable instructions, as well as the software for executing acts (typically machine-readable instructions) that produce a desired result. In several exemplary embodiments, a computer system may include hybrids of hardware and software, as well as computer sub-systems.

In several exemplary embodiments, hardware generally includes at least processor-capable platforms, such as client-machines (also known as personal computers or servers), and hand-held processing devices (such as smart phones, tablet computers, personal digital assistants (PDAs), or personal computing devices (PCDs), for example). In several exemplary embodiments, hardware may include any physical device that is capable of storing machine-readable instructions, such as memory or other data storage devices. In several exemplary embodiments, other forms of hardware include hardware sub-systems, including transfer devices such as modems, modem cards, ports, and port cards, for example.

In several exemplary embodiments, software includes any machine code stored in any memory medium, such as RAM or ROM, and machine code stored on other devices (such as floppy disks, flash memory, or a CD ROM, for example). In several exemplary embodiments, software may include source or object code. In several exemplary embodiments, software encompasses any set of instructions capable of being executed on a node such as, for example, on a client machine or server.

In several exemplary embodiments, combinations of software and hardware could also be used for providing enhanced functionality and performance for certain embodiments of the present disclosure. In an exemplary embodiment, software functions may be directly manufactured into a silicon chip. Accordingly, it should be understood that combinations of hardware and software are also included within the definition of a computer system and are thus envisioned by the present disclosure as possible equivalent structures and equivalent methods.

In several exemplary embodiments, computer readable mediums include, for example, passive data storage, such as a random access memory (RAM) as well as semi-permanent data storage such as a compact disk read only memory (CD-ROM). One or more exemplary embodiments of the present disclosure may be embodied in the RAM of a computer to transform a standard computer into a new specific computing machine. In several exemplary embodiments, data structures are defined organizations of data that may enable an embodiment of the present disclosure. In an exemplary embodiment, a data structure may provide an organization of data, or an organization of executable code.

In several exemplary embodiments, any networks and/or one or more portions thereof, may be designed to work on any specific architecture. In an exemplary embodiment, one or more portions of any networks may be executed on a single computer, local area networks, client-server networks, wide area networks, internets, hand-held and other portable and wireless devices and networks.

In several exemplary embodiments, a database may be any standard or proprietary database software, such as Oracle, Microsoft Access, SyBase, or DBase II, for example. In several exemplary embodiments, the database may have fields, records, data, and other database elements that may be associated through database specific software. In several exemplary embodiments, data may be mapped. In several exemplary embodiments, mapping is the process of associating one data entry with another data entry. In an exemplary embodiment, the data contained in the location of a character file can be mapped to a field in a second table. In several exemplary embodiments, the physical location of the database is not limiting, and the database may be distributed. In an exemplary embodiment, the database may exist remotely from the server, and run on a separate platform. In an exemplary embodiment, the database may be accessible across the Internet. In several exemplary embodiments, more than one database may be implemented.

In several exemplary embodiments, a plurality of instructions stored on a computer readable medium may be executed by one or more processors to cause the one or more processors to carry out or implement in whole or in part the above-described operation of each of the above-described systems, methods, and/or any combination thereof. In several exemplary embodiments, such a processor may include one or more of the microprocessor 1000a, any processor(s) that are part of the components of the above-described systems, and/or any combination thereof, and such a computer readable medium may be distributed among one or more components of the above-described systems. In several exemplary embodiments, such a processor may execute the plurality of instructions in connection with a virtual computer system. In several exemplary embodiments, such a plurality of instructions may communicate directly with the one or more processors, and/or may interact with one or more operating systems, middleware, firmware, other applications, and/or any combination thereof, to cause the one or more processors to execute the instructions.

A method of obtaining transportation data associated with an object has been described that capturing, using a wearable device, an object identifier associated with the object; wherein the object is one of: a customer of a good or service; and an article used in connection with the good or service; transmitting the object identifier from the wearable device to a computer server; identifying, using the computer server, the object in response to the receipt of the object identifier; and obtaining, using the computer server, the transportation data associated with the object. In another embodiment, the method also includes transmitting the transportation data from the computer server to the wearable device; and at least one of: displaying the transportation data on the wearable device, and audibly announcing the transportation data from the wearable device. In yet another embodiment, the wearable device comprises an image sensor and a graphical display, the object is the customer, the object identifier is a plurality of facial features associated with the customer, and the transportation data is customer data; wherein capturing the object identifier comprises activating the image sensor while the image sensor is pointed towards the plurality of facial features to capture the plurality of facial features; wherein identifying the object comprises identifying the customer using the plurality of facial features; and wherein displaying the transportation data on the wearable device comprises displaying the customer data on the graphical display. In still yet another embodiment, the method also includes transmitting the transportation data from the wearable device to another wearable device. In another embodiment, the method also includes transmitting status data associated with a status of the object to the computer server; transmitting data associated with the wearable device to the computer server; and storing the data associated with the wearable device and the status data in the computer server. In another embodiment, the wearable device comprises an image sensor, the object is the article and the article is a piece of baggage, the object identifier is a barcode attached to the piece of baggage, the status data is a stage of transit of the piece of baggage, the data associated with the wearable device is an identity of a user of the wearable device; wherein capturing the object identifier comprises activating the image sensor when the image sensor is pointed towards the barcode as the piece of baggage enters the stage of transit; and wherein storing the data associated with the wearable device and the status data in the computer server comprises storing the identity of the user and the stage of transit of the piece of baggage in the computer server. In yet another embodiment, the method also includes transmitting the transportation data from the computer server to another wearable device; and at least one of: displaying the transportation data on the another wearable device, and audibly announcing the transportation data from the another wearable device. In yet another embodiment, the article used in connection with the good or service is a portion of an airplane and the transportation data associated with the article is maintenance data relating to the portion of the airplane. In another embodiment, the good or the service is provided by an airline. In yet another embodiment, the wearable device comprises at least one of glasses, goggles, a wristband, an earpiece, a watch, a glove, a ring, a hat, and an anklet.

An apparatus for obtaining transportation data associated with an object has been described, the apparatus includes a non-transitory computer readable medium; and a plurality of instructions stored on the non-transitory computer readable medium and executable by one or more processors, the plurality of instructions comprising: instructions that cause the one or more processors to capture an object identifier associated with the object; wherein the object is one of: a customer of a good or service; and an article used in connection with the good or service; instructions that cause the one or more processors to transmit the object identifier from a wearable device to a computer server; instructions that cause the one or more processors to identify the object in response to the receipt of the object identifier; and instructions that cause the one or more processors to obtain the transportation data associated with the object. In another embodiment, the plurality of instructions further includes instructions that cause the one or more processors to transmit the transportation data from the computer server to the wearable device; and at least one of: instructions that cause the one or more processors to display the transportation data on the wearable device, and instructions that cause the one or more processors to audibly announce the transportation data from the wearable device. In yet another embodiment, the wearable device comprises an image sensor and a graphical display, the object is the customer, the object identifier is a plurality of facial features associated with the customer, and the transportation data is customer data; wherein instructions that cause the one or more processors to capture the object identifier comprise instructions that cause the one or more processors to activate the image sensor while the image sensor is pointed towards the plurality of facial features associated with the customer to capture the plurality of facial features associated with the customer; wherein the instructions that cause the one or more processors to identify the object comprise instructions that cause the one or more processors to identify the customer using the plurality of facial features; and wherein the instructions that cause the one or more processors to display the transportation data on the wearable device comprise instructions that cause the one or more processors to display the customer data on the graphical display. In yet another embodiment, the plurality of instructions further includes instructions that cause the one or more processors to transmit the transportation data from the wearable device to another wearable device. In yet another embodiment, the plurality of instructions further includes instructions that cause the one or more processors to transmit status data associated with a status of the object to the computer server; instructions that cause the one or more processors to transmit data associated with the wearable device to the computer server; and instructions that cause the one or more processors to store the data associated with the wearable device and the status data in the computer server. In still yet another embodiment, the wearable device comprises an image sensor, the object is a piece of baggage, the object identifier is a barcode attached to the piece of baggage, the status data is a stage of transit of the piece of baggage, the data associated with the wearable device is an identity of a user of the wearable device; wherein the instructions that cause the one or more processors to capture the object identifier comprise instructions that cause the one or more processors to activate the image sensor when the image sensor is pointed towards the barcode as the piece of baggage enters the stage of transit; and wherein the instructions that cause the one or more processors to store the data associated with the wearable device and the status data in the computer server comprise instructions that cause the one or more processors to store the identity of the user and the stage of transit of the piece of baggage in the computer server. In another embodiment, the plurality of instructions further includes instructions that cause the one or more processors to transmit the transportation data from the computer server to another wearable device; and at least one of: instructions that cause the one or more processors to display the transportation data on the another wearable device, and instructions that cause the one or more processors to audibly announce the transportation data from the another wearable device. In still yet another embodiment, the article used in connection with the good or service is a portion of an airplane and the transportation data associated with the article is maintenance data relating to the portion of the airplane. In still yet another embodiment, the good or the service is provided by an airline. In another embodiment, the wearable device comprises at least one of glasses, goggles, a wristband, an earpiece, a watch, a glove, a ring, a hat, and an anklet.

A method has been described that includes establishing a communication link between a data tag and a wearable device to receive a seat identifier of a seat that is associated with the data tag and that is assigned to a customer; transmitting, using the wearable device, the seat identifier from the wearable device to a computer server; obtaining, using the computer server, customer data associated with the assigned seat; transmitting the customer data from the computer server to the wearable device; and at least one of: displaying the customer data on the wearable device; and audibly announcing the customer data from the wearable device. In another embodiment, the data tag is a near field communication tag; wherein the near field communication device is connected to, or in the vicinity of, the assigned seat; and wherein establishing a communication link between the data tag and the wearable device comprises touching the near field communication tag with the wearable device. In yet another embodiment, the wearable device comprises at least one of glasses, goggles, a wristband, an earpiece, a watch, a glove, a ring, a hat, and an anklet.

It is understood that variations may be made in the foregoing without departing from the scope of the present disclosure. For example, instead of, or in addition to transportation transactions often conducted in the course of airline industry business, aspects of the present disclosure are applicable and/or readily adaptable to transportation transactions conducted in other industries, including rail, bus, cruise and other travel or shipping industries, rental car industries, hotels and other hospitality industries, entertainment industries, and other industries. In an exemplary embodiment, aspects of the present disclosure are readily applicable and/or readily adaptable to a shipping travel leg in which a ship travels from one port to one or more other ports. In an exemplary embodiment, aspects of the present disclosure are readily applicable and/or readily adaptable to a trucking travel leg during which a truck travels from one city to one or more other cities. In an exemplary embodiment, aspects of the present disclosure are readily applicable and/or readily adaptable to a rail travel leg during which a train travels from one city or station to one or more other cities or stations. In an exemplary embodiment, aspects of the present disclosure are applicable and/or readily adaptable to a wide variety of transportation transactions such as, for example, an airline sequence or itinerary (i.e., a plurality of airline flights), a travel leg of an airline sequence or itinerary (i.e., a single airline flight), an airline block, and/or any combination thereof.

In several exemplary embodiments, the elements and teachings of the various illustrative exemplary embodiments may be combined in whole or in part in some or all of the illustrative exemplary embodiments. In addition, one or more of the elements and teachings of the various illustrative exemplary embodiments may be omitted, at least in part, and/or combined, at least in part, with one or more of the other elements and teachings of the various illustrative embodiments.

Any spatial references such as, for example, "upper," "lower," "above," "below," "between," "bottom," "vertical," "horizontal," "angular," "upwards," "downwards," "side-to-side," "left-to-right," "right-to-left," "top-to-bottom," "bottom-to-top," "top," "bottom," "bottom-up," "top-down," etc., are for the purpose of illustration only and do not limit the specific orientation or location of the structure described above.

In several exemplary embodiments, while different steps, processes, and procedures are described as appearing as distinct acts, one or more of the steps, one or more of the processes, and/or one or more of the procedures may also be performed in different orders, simultaneously and/or sequentially. In several exemplary embodiments, the steps, processes and/or procedures may be merged into one or more steps, processes and/or procedures.

In several exemplary embodiments, one or more of the operational steps in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations.

Although several exemplary embodiments have been described in detail above, the embodiments described are exemplary only and are not limiting, and those skilled in the art will readily appreciate that many other modifications, changes and/or substitutions are possible in the exemplary embodiments without materially departing from the novel teachings and advantages of the present disclosure. Accordingly, all such modifications, changes and/or substitutions are intended to be included within the scope of this disclosure as defined in the following claims. In the claims, any means-plus-function clauses are intended to cover the structures described herein as performing the recited function and not only structural equivalents, but also equivalent structures.

What is claimed is:

1. A method of obtaining transportation data associated with both an object and a mobile application, the method comprising:
   capturing, using a wearable device worn by an airline employee, an object identifier associated with the object;
      wherein the object is an article used in connection with the good or service that is provided by the airline;
   transmitting the object identifier and an application identifier from the wearable device to a computer server;
      wherein the application identifier is associated with both the mobile application and the airline employee who is wearing the wearable device;
   transmitting status data associated with a status of the object to the computer server;
      wherein the status is at least one of:
         a status associated with a readiness of an airplane operated by the airline; and
         a status associated with a need for repair or maintenance of the article used in connection with the good or service that is provided by the airline;
   identifying, using the computer server, the object in response to the receipt of the object identifier;
   obtaining, using the computer server, the transportation data associated with the object and the mobile application;
   storing the status data in the computer server;

transmitting the transportation data from the computer server to the wearable device; and
at least one of:
displaying the transportation data on the wearable device so that the airline employee is able to read the transportation data while concurrently performing work-related activities; and
audibly announcing the transportation data from the wearable device so that the airline employee is able to hear the transportation data while concurrently performing work-related activities;
wherein the airline employee is a mechanic;
wherein the status is at least the status associated with the need for repair or maintenance of the article used in connection with the good or service that is provided by the airline;
wherein the article used in connection with the good or service is a portion of the airplane and the transportation data associated with the article is maintenance data relating to the portion of the airplane; and
wherein the maintenance data comprises at least one of:
a maintenance manual associated with the portion of the airplane;
maintenance instructions associated with the portion of the airplane; and
step-by-step instructions relating to the maintenance of the portion of the airplane.

2. The method of claim 1, further comprising transmitting the transportation data from the wearable device to another wearable device.

3. The method of claim 1, further comprising:
transmitting data associated with the wearable device to the computer server; and
storing the data associated with the wearable device in the computer server.

4. The method of claim 1, further comprising:
transmitting the transportation data from the computer server to another wearable device; and
at least one of:
displaying the transportation data on the another wearable device, and
audibly announcing the transportation data from the another wearable device.

5. The method of claim 1, wherein the wearable device comprises at least one of glasses, goggles, a wristband, an earpiece, a watch, a glove, a ring, a hat, and an anklet.

6. An apparatus for obtaining transportation data associated with both an object and a mobile application, the apparatus comprising:
a non-transitory computer readable medium; and
a plurality of instructions stored on the non-transitory computer readable medium and executable by one or more processors, the plurality of instructions comprising:
instructions that cause the one or more processors to capture an object identifier associated with the object;
wherein the object is an article used in connection with the good or service that is provided by the airline;
instructions that cause the one or more processors to transmit the object identifier and an application identifier from a wearable device to a computer server;
wherein the wearable device is worn by an airline employee; and
wherein the application identifier is associated with both the mobile application and the airline employee who is wearing the wearable device;
instructions that cause the one or more processors to transmit status data associated with a status of the object to the computer server; wherein the status is at least one of:
a status associated with a readiness of an airplane operated by the airline; and
a status associated with a need for repair or maintenance of the article used in connection with the good or service that is provided by the airline;
instructions that cause the one or more processors to identify the object in response to the receipt of the object identifier;
instructions that cause the one or more processors to obtain the transportation data associated with the object and the mobile application;
instructions that cause the one or more processors to store the status data in the computer server;
instructions that cause the one or more processors to transmit the transportation data from the computer server to the wearable device;
and
at least one of:
instructions that cause the one or more processors to display the transportation data on the wearable device so that the airline employee is able to read the transportation data while concurrently performing work-related activities,
and
instructions that cause the one or more processors to audibly announce the transportation data from the wearable device so that the airline employee is able to hear the transportation data while concurrently performing work-related activities;
wherein the airline employee is a mechanic;
wherein the status is at least the status associated with the need for repair or maintenance of the article used in connection with the good or service that is provided by the airline;
wherein the article used in connection with the good or service is a portion of the airplane and the transportation data associated with the article is maintenance data relating to the portion of the airplane; and
wherein the maintenance data comprises at least one of:
a maintenance manual associated with the portion of the airplane;
maintenance instructions associated with the portion of the airplane; and
step-by-step instructions relating to the maintenance of the portion of the airplane.

7. The apparatus of claim 6, wherein the plurality of instructions further comprises instructions that cause the one or more processors to transmit the transportation data from the wearable device to another wearable device.

8. The apparatus of claim 6, wherein the plurality of instructions further comprises:
instructions that cause the one or more processors to transmit data associated with the wearable device to the computer server; and
instructions that cause the one or more processors to store the data associated with the wearable device in the computer server.

9. The apparatus of claim 6, wherein the plurality of instructions further comprises:
instructions that cause the one or more processors to transmit the transportation data from the computer server to another wearable device; and
at least one of:

instructions that cause the one or more processors to display the transportation data on the another wearable device, and instructions that cause the one or more processors to audibly announce the transportation data from the another wearable device.

10. The apparatus of claim 6, wherein the wearable device comprises at least one of glasses, goggles, a wristband, an earpiece, a watch, a glove, a ring, a hat, and an anklet.

* * * * *